US009635064B2

(12) United States Patent
Solis et al.

(10) Patent No.: US 9,635,064 B2
(45) Date of Patent: Apr. 25, 2017

(54) APPARATUS, METHOD, AND COMPUTER PROGRAM FOR STREAMING MEDIA PERIPHERAL ADDRESS AND CAPABILITY CONFIGURATION

(75) Inventors: Juan Antonio Solis, Dallas, TX (US); Alex Pogostin, Richardson, TX (US); Jason Talley, Garland, TX (US)

(73) Assignee: AMX LLC, Richardson, TX (US)

( * ) Notice: Subject to any disclaimer, the term of this patent is extended or adjusted under 35 U.S.C. 154(b) by 310 days.

(21) Appl. No.: 13/483,574

(22) Filed: May 30, 2012

(65) Prior Publication Data

US 2012/0311078 A1    Dec. 6, 2012

Related U.S. Application Data

(60) Provisional application No. 61/491,519, filed on May 31, 2011.

(51) Int. Cl.
*G06F 15/16* (2006.01)
*H04L 29/06* (2006.01)

(52) U.S. Cl.
CPC .......... *H04L 65/1069* (2013.01); *H04L 69/24* (2013.01)

(58) Field of Classification Search
CPC ................ H04L 63/08; H04L 63/0428; H04L 29/12216; H04L 12/2801; H04L 29/06
USPC .................. 709/227, 217, 218, 230; 370/401
See application file for complete search history.

(56) References Cited

U.S. PATENT DOCUMENTS

| 6,856,602 | B1* | 2/2005 | Westberg ................ H04L 45/02 370/254 |
| 6,876,667 | B1* | 4/2005 | Synnestvedt et al. ........ 370/466 |
| 6,952,428 | B1* | 10/2005 | Necka et al. ................. 370/466 |
| 7,174,371 | B2* | 2/2007 | Elo et al. ....................... 709/220 |
| 7,376,091 | B1* | 5/2008 | Eccles et al. ................. 370/265 |
| 7,646,713 | B1* | 1/2010 | Absillis et al. ............ 370/230.1 |
| 7,658,319 | B2* | 2/2010 | Howarth et al. .............. 235/375 |
| 8,285,875 | B2* | 10/2012 | Gandhewar et al. ......... 709/245 |
| 8,345,572 | B2* | 1/2013 | Furutani ........................ 370/252 |
| 2003/0039237 | A1* | 2/2003 | Forslow ....................... 370/352 |
| 2003/0043781 | A1* | 3/2003 | Proctor et al. ................ 370/352 |
| 2004/0054689 | A1* | 3/2004 | Salmonsen et al. ....... 707/104.1 |
| 2005/0066048 | A1* | 3/2005 | Young ..................... G06F 21/10 709/231 |
| 2005/0078681 | A1* | 4/2005 | Sanuki et al. ............. 370/395.5 |
| 2005/0114880 | A1* | 5/2005 | Gould ............................. 725/25 |
| 2005/0128947 | A1* | 6/2005 | Silverman ..................... 370/232 |
| 2005/0252957 | A1* | 11/2005 | Howarth et al. .............. 235/375 |
| 2006/0002324 | A1* | 1/2006 | Babbar et al. ................ 370/325 |

(Continued)

FOREIGN PATENT DOCUMENTS

WO     WO99/18751     *    4/1999    ............. H04L 12/28

OTHER PUBLICATIONS

R. Droms, Network Working Group, Request for Comments: RFC 2131—Dynamic Host Configuration Protocol, Mar. 1997.*

(Continued)

*Primary Examiner* — Joshua Joo

(57) ABSTRACT

A network-enabled device may include an interface operably connected to an interface of a streaming media device, and be configured to receive a request from the streaming media device. The network-enabled device may also include a processor configured to allow the request from the streaming media device based on a vendor matching policy.

20 Claims, 4 Drawing Sheets

(56) References Cited

U.S. PATENT DOCUMENTS

| | | | |
|---|---|---|---|
| 2006/0130139 A1* | 6/2006 | Sobel et al. ................... | 726/22 |
| 2006/0153122 A1* | 7/2006 | Hinman et al. ................. | 370/328 |
| 2006/0271488 A1* | 11/2006 | Maes ..................... | G06Q 30/00 705/52 |
| 2007/0005796 A1* | 1/2007 | Reynders ..................... | 709/232 |
| 2007/0058629 A1* | 3/2007 | Luft ............................. | 370/390 |
| 2007/0061484 A1* | 3/2007 | Droms et al. ................. | 709/245 |
| 2007/0123253 A1* | 5/2007 | Simongini et al. ........... | 455/433 |
| 2007/0203990 A1* | 8/2007 | Townsley et al. ............ | 709/206 |
| 2007/0250605 A1* | 10/2007 | Duchene et al. ............. | 709/220 |
| 2008/0031308 A1* | 2/2008 | Kim et al. .................... | 375/142 |
| 2009/0196290 A1* | 8/2009 | Zhao et al. ................... | 370/392 |
| 2011/0055928 A1* | 3/2011 | Brindza ......................... | 726/26 |
| 2012/0023562 A1* | 1/2012 | Harp et al. ........................ | 726/7 |
| 2012/0233686 A1* | 9/2012 | Savage ................... | G06F 21/41 726/11 |
| 2012/0284702 A1* | 11/2012 | Ganapathy et al. .......... | 717/174 |
| 2014/0199985 A1* | 7/2014 | Lovich et al. ................ | 455/418 |
| 2014/0254611 A1* | 9/2014 | Vavili et al. .................. | 370/474 |

OTHER PUBLICATIONS

M. Patrick, Network Working Group, Request for Comments: RFC 3046—DHCP Relay Agent Information Option, Jan. 2001.*

K. Kinnear et al., Network Working Group, Request for Comments: RFC 3527—Link Selection Sub-Option for the Relay Agent Information Option in DHCPv4.*

Duchow, D.; Bahls, Thomas; Timmermann, D., "ACIP: An Access Control and Information Protocol for Ethernetbased Broadband Access Networks," Telecommunications Network Strategy and Planning Symposium, 2006. Networks 2006. 12th International , vol., No., pp. 1,6, Nov. 2006. doi: 10.1109/NETWKS.2006. 300382.*

ESTI TR 102 542 v1.1.1: Digital Video Broadcasting (DVB); Transport of MPEG-2 Based DVB Servies over IP Based Networks, Sep. 2006.*

Stienstra, A.J., "Technologies for DVB Services on the Internet," Proceedings of the IEEE , vol. 94, No. 1, pp. 228,236, Jan. 2006. doi: 10.1109/JPROC.2005.861016.*

DVB-HN (Home Network) Reference Model Phase 1, DVB Document A109, Feb. 2007.*

DVB-HN Commercial Requirements Phase 1, DVB Document A144, Nov. 2009.*

A. Cohen et al., Migration to Ethernet-based DSL Aggregation, Architecture and Transport Working Group Technical Report, DSL Forum TR-101, Apr. 2006.*

Gallego, I.L.; Garcia, F.R.; Valverde, J.M.P.; Rizaldos, J.L.; Vidal, F.G., "DLNA-Based IPTV Platform," Consumer Communications and Networking Conference, 2009. CCNC 2009. 6th IEEE , vol., No., pp. 1,5, Jan. 10-13, 2009. doi: 10.1109/CCNC.2009.4784833.*

Max Cloud Hosting, How much is 1 byte, 1KB, 1MB, 1GB, 1TB, 1 PB, 1 EB, 1ZB, 1YB, p. 1, Sep. 7, 2011.*

Introcomputing.org, Bits and Bytes, pp. 1-2, Aug. 12, 2012.*

* cited by examiner

APPARATUS, METHOD, AND COMPUTER PROGRAM FOR STREAMING MEDIA PERIPHERAL ADDRESS AND CAPABILITY CONFIGURATION

CROSS-REFERENCE TO RELATED APPLICATION

This application claims the benefit of U.S. Provisional Patent Application No. 61/491,519, filed on May 31, 2011, the subject matter of which is hereby incorporated by reference in its entirety.

FIELD

The present disclosure pertains to addressing and configuring media peripherals, and more particularly, to providing addressing information to, and configuring of, streaming media peripherals.

BACKGROUND

Currently, special communication protocols and separate connections between the streaming peripheral and the display device are required to configure the streaming peripheral. However, configuring capabilities requested of the streaming peripheral by network-enabled display devices without using special connectors may be beneficial. It may also be beneficial to restrict which streaming peripheral devices can communicate with network-enabled display devices.

SUMMARY

Certain embodiments of the present invention may provide solutions to the problems and needs in the art that have not yet been fully identified, appreciated, or solved by current streaming peripheral configuration systems. For example, in some embodiments, addressing information may be provided to streaming media peripherals, and the capabilities being requested of the streaming media peripherals may be configured by network-enabled display devices, such as a display or panel, without using special connectors. In certain embodiments, streaming media peripherals devices may be restricted as to which network-enabled display devices the streaming media peripherals devices may communicate with. Such embodiments maximize the use of open protocols to convey information and do not require a special cable or connection. These embodiments also allow the network-enabled display device to determine if the network-enabled display device's capability configuration should be sent to the streaming media peripheral.

In one embodiment, a network-enabled device may include an interface operably connected to an interface of a streaming media device, and be configured to receive a request from the streaming media device. The network-enabled device may also include a processor configured to allow the request from the streaming media device based on a vendor matching policy.

In another embodiment, a computer-implemented method may include receiving, at a network-enabled device, a request message from a streaming media device. The method may further include transmitting, at the network-enabled device, an acknowledgement message based on a vendor matching policy.

In yet another embodiment, a computer program may be embodied on a non-transitory computer-readable medium. The computer program may be configured to cause a processor to receive a request message from a streaming media device, and transmit an acknowledgement message based on a vendor matching policy.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

One or more embodiments pertain to providing addressing information to streaming media peripherals, and configuring the capabilities being requested of the streaming media peripherals by, for example, network-enabled display devices, without using special connectors.

Figure 1:
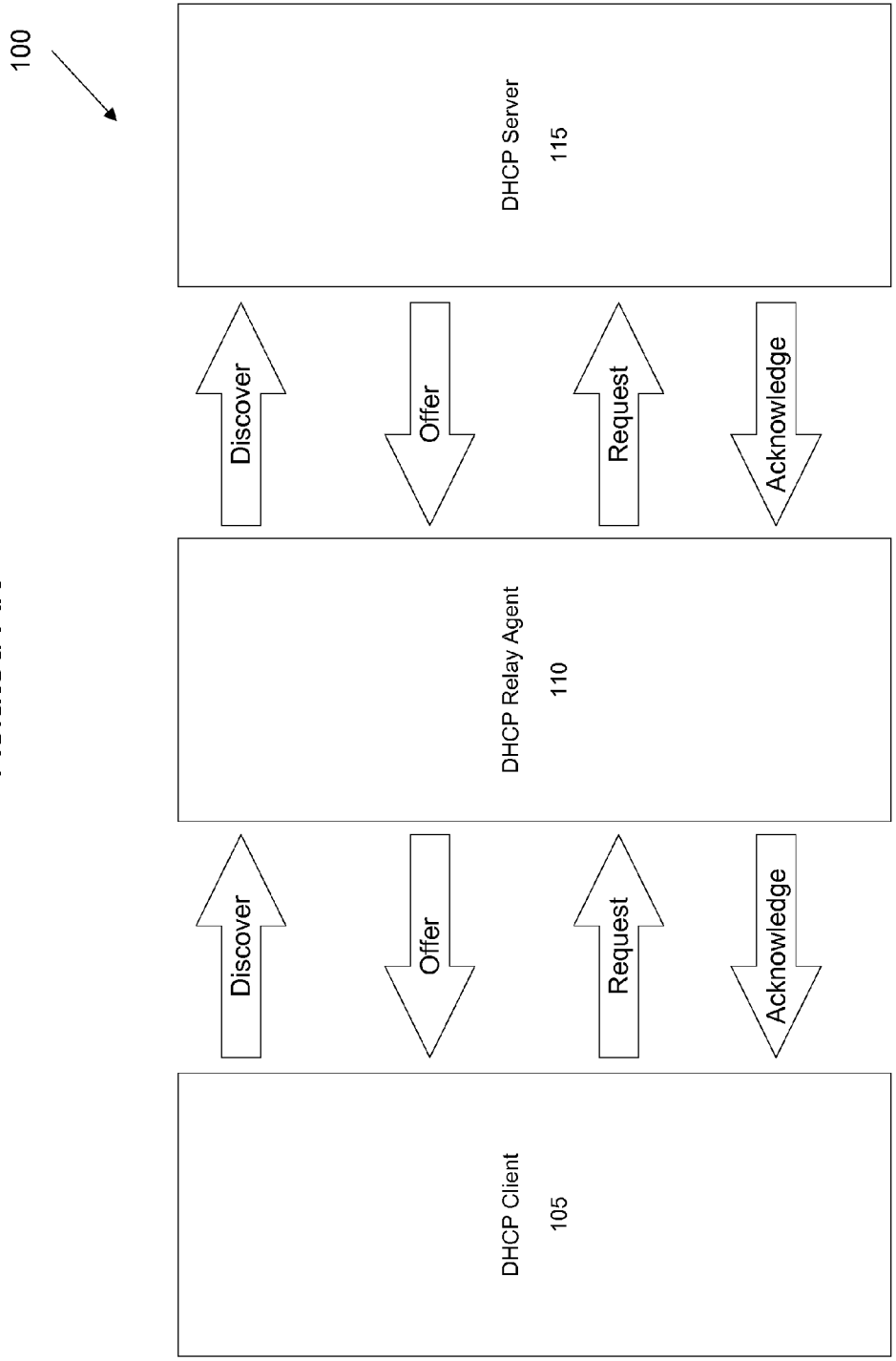
FIG. 1 illustrates a block diagram of a system for assigning an Internet Protocol (IP) address.

FIG. 1 illustrates a flow diagram of a system 100 for assigning an IP address. For instance, system 100 uses a dynamic host configuration protocol (DHCP) relay related packets to allow a DHCP server 115 to assign IP addresses using network topology information.

In a conventional DHCP relay assisted address negotiation, a DHCP client 105 issues a discover message request that is generally sent as a broadcast message. A DHCP relay agent 110 receives the discover message request and appends "Option 82" information. "Option 82" information includes circuit identification (ID) and remote ID. Such information allows DHCP server 115 to determine where in a network topology the request is coming from and assign an IP address based on the information technology (IT) enterprise policies.

DHCP server 115 reserves an appropriate DHCP address for DHCP client 105 and issues an offer packet. DHCP relay agent 110 strips out any "Option 82" information and forwards the modified offer packet to DHCP client 105.

DHCP client 105 issues a request packet, which will be received by DHCP relay agent 110. DHCP relay agent 110 appends "Option 82" information, and forwards the appended packet to DHCP server 115. DHCP server 115 transmits an acknowledged packet to DHCP relay agent 110, and DHCP relay agent 110 removes "Option 82" information from the acknowledgement packet. The acknowledgement packet is then transmitted to DHCP client 105, and the address is now bound to DHCP client 105.

An Ethernet layer for an IP network includes a MAC address, which is 48-bits of information (i.e., 6 bytes). By convention, the first 3 bytes are categorized as a manufacturer ID or a vendor ID. Each maker of Ethernet network-enabled equipment includes its own identifier or set of identifiers, which are normally not leveraged for application purposes.

Embodiments of the present invention may provide video configuration data as part of the regular handshake to quickly discern allowed devices that can connect to the display device or network-enabled display device. For example, in FIG. 2, a streaming media device 220 may be connected directly to network-enabled display device 205. This configuration allows for a point-to-point connection to be established, thus removing the need for a DHCP relay agent. Furthermore, such a configuration allows streaming media device (or DHCP client) 220 and network-enabled display device (or DHCP server) 205 to both view "Option 82" information, e.g., circuit ID and remote ID.

In this embodiment, network-enabled device 205 may include two network interfaces 210, 215. First network-enabled display device network interface 210 may connect network-enabled display device 205 to a network 240 for external visibility, and second network-enabled display device network interface 215 may connect to a streaming media device 220 for dedicated point-to-point network connection.

Streaming media device 220 may also include at least two network interfaces 225, 230. First streaming media device network interface 225 may allow for a connection to be established between streaming media device 220 and network-enabled display device 205. Second streaming media device network interface 230 may be connected to any device, as would be readily appreciated by a person of ordinary skill in the art.

Such an embodiment enables configuration of second network-enabled display device network interface 215 (for point-to-point connection) with a dedicated DHCP server instance. The dedicated DHCP server instance may allow or reject DHCP address requests based on the policies implemented, the vendor ID of the originating equipment's media access control (MAC) address (located in the first 3 bytes of the packet), or based on a combination with "Option 82" information, which is normally used for network topology planning purposes.

The vendor matching policy may be implemented via DHCP address pools, which can be configured to allow IP address requests from a streaming media device 220 that is connected to second network-enabled display device network interface 215 of network-enabled display device 205. This policy can be implemented by inspecting the MAC address of an incoming packet, using a combination of "Option 82" circuit ID or "Option 82" remote ID, or some combination thereof. The incoming packet may also include manufacturer and/or vendor ID information in the first 3-bytes of the packet. Thus, plugging in non-approved equipment to an Ethernet connector would result in a failed attempt to receive an IP address and prevent information from being granted to the connecting device.

Furthermore, "Option 82" information (for example the remote ID) can be used to provide key configuration data to streaming media device 220. Key configuration data may include, for example, expected video formats that can be displayed on network-enabled display device 205.

Figure 2:
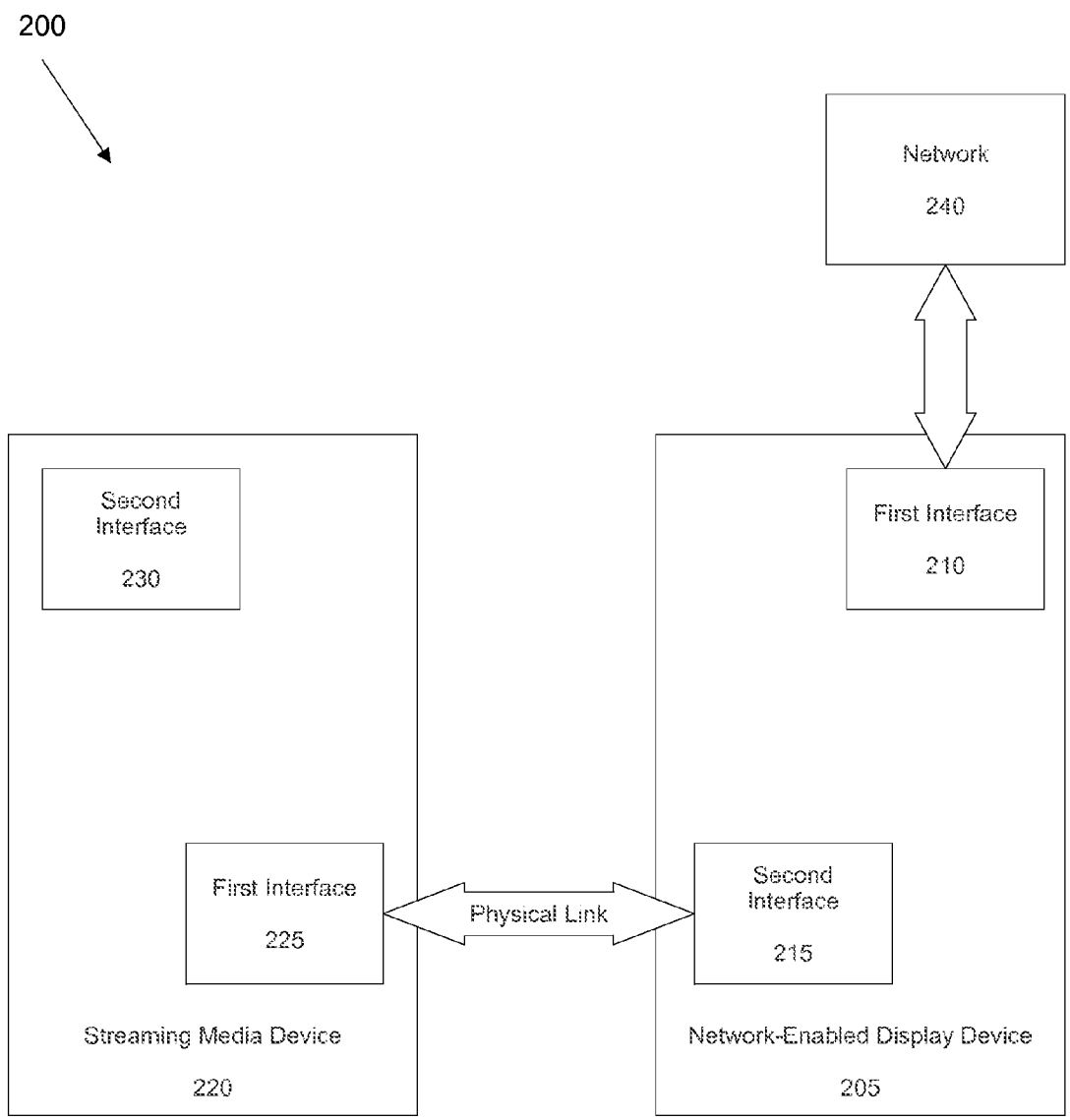
FIG. 2 illustrates a system for connecting a media device and a network-enabled device, according to one embodiment of the present invention.
Figure 3:
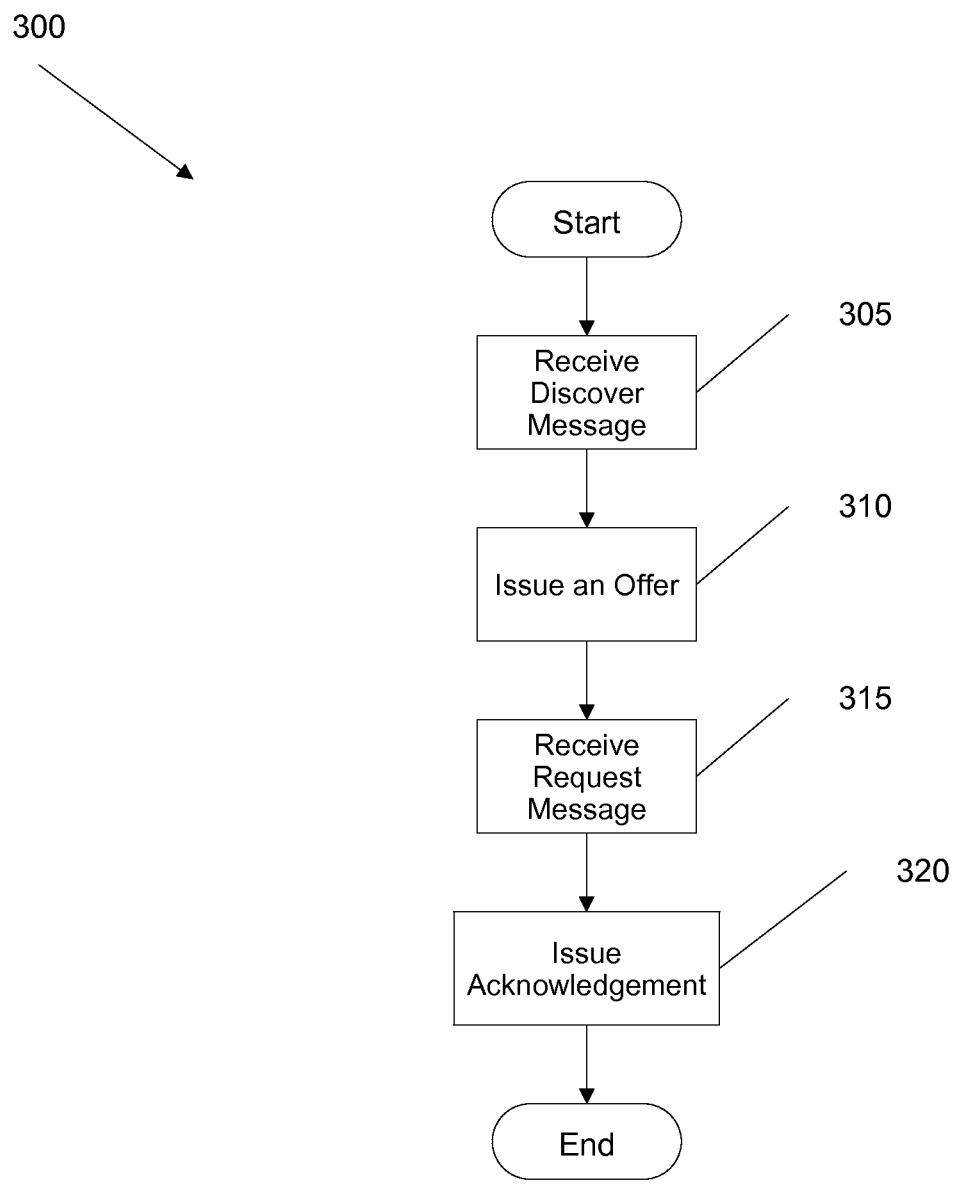
FIG. 3 is a flowchart illustrating a process 300 for connecting a media device and a network-enabled device, according to an embodiment of the present invention.

The embodiments of the present invention allow for network planning policies that are normally used by DHCP for address allocation to also may be used in network-enabled display device 205, as depicted in FIG. 2, to achieve video capability and connection and configuration data exchange. For example, FIG. 3 is a flowchart illustrating a process 300 for connecting a streaming media device to a network-enabled display device. Process 300 may be performed by the components shown in FIG. 2, or the computing system shown in FIG. 4.

At 305, network-enabled device 205 receives a discover message from streaming media device 220. Network-enabled device 205 may reserve an appropriate address for streaming media device 220 and issue an offer that includes "Option 82" information at 310. At 315, network-enabled device 205 receives a request message from streaming media device 220 containing "Option 82" information. At 320, network-enabled device 205 issues an acknowledgement that includes "Option 82" information, and the acknowledgement is received by streaming media device 220.

The method steps shown in FIG. 3 may be performed, in part, by a computer program, encoding instructions for a nonlinear adaptive processor to cause at least the method described in FIG. 3 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the method described in FIG. 3, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Figure 4:
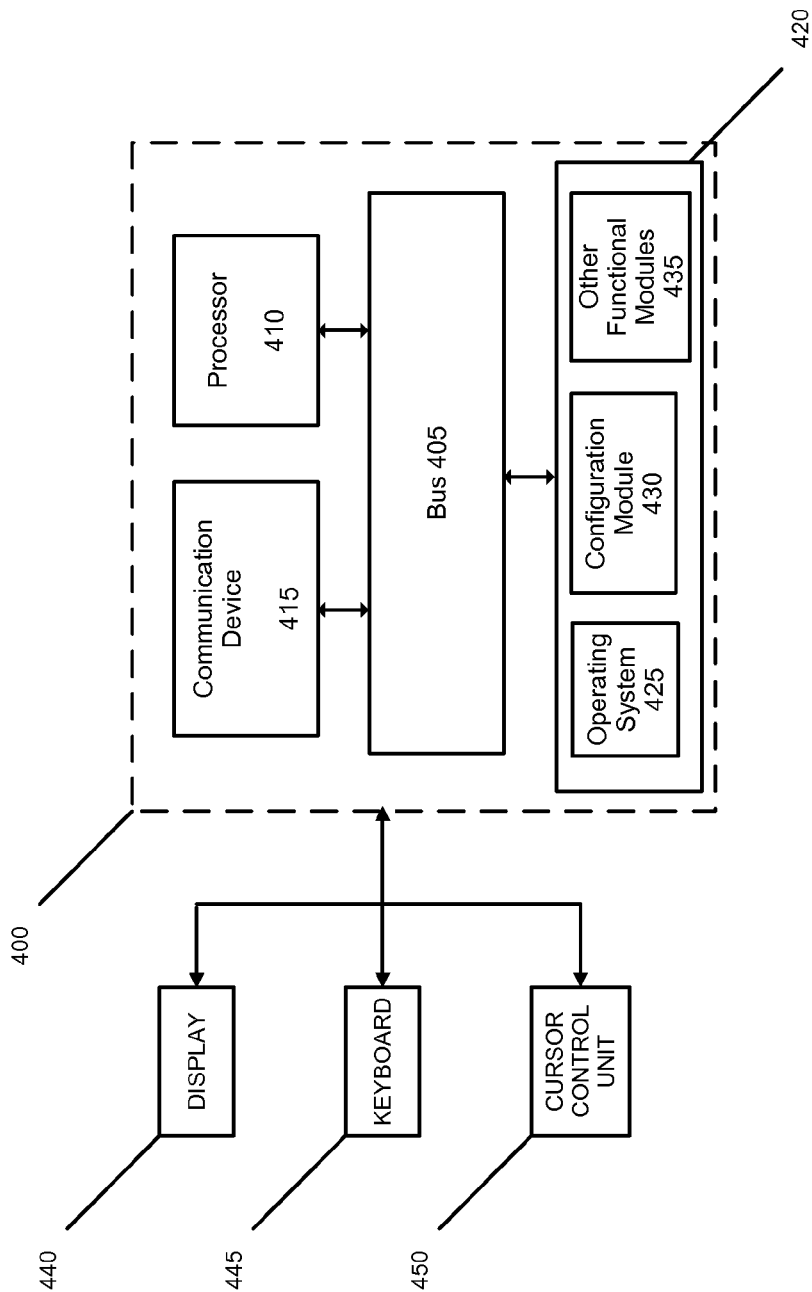
FIG. 4 illustrates a system, according to an embodiment of the present invention.

FIG. 4 illustrates a block diagram of a system 400, according to an embodiment of the present invention. System 400 may include a bus 405 or other communication mechanism that can communicate information and a processor 410, coupled to bus 405, that can process information. Processor 410 can be any type of general or specific purpose processor. System 400 may also include memory 420 that can store information and instructions to be executed by processor 410. Memory 420 can be comprised of any combination of random access memory ("RAM"), read only memory ("ROM"), static storage such as a magnetic or optical disk, or any other type of computer readable medium. System 400 may also include a communication device 415, such as a network interface card, that may provide access to a network.

The computer readable medium may be any available media that can be accessed by processor 410. The computer readable medium may include both volatile and nonvolatile medium, removable and non-removable media, and communication media. The communication media may include computer readable instructions, data structures, program modules, or other data and may include any information delivery media.

Processor 410 can also be coupled via bus 405 to a display 440, such as a Liquid Crystal Display ("LCD"). Display 440 may display information to the user. A keyboard 445 and a cursor control unit 450, such as a computer mouse, may also be coupled to bus 405 to enable the user to interface with system 400.

According to one embodiment, memory 420 may store software modules that may provide functionality when executed by processor 410. The modules can include an operating system 425 and a streaming media configuration module 430, as well as other functional modules 435. Operating system 425 may provide operating system functionality for system 400. Because system 400 may be part of a larger system, system 400 may include one or more additional functional modules 435 to include the additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

One or more embodiments of the present invention pertain to connecting a streaming media device directly to a network-enabled display device. This allows the system to become a point-to-point connection without requiring a DHCP relay agent in the middle of the streaming media device and the network-enabled display device. This also allows the streaming media device and the network-enabled display device to both have visibility into "Option 82" information (client ID and remote ID).

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A network-enabled device, comprising:
   an interface of the network-enabled device directly connected to an interface of a streaming media device bypassing a dynamic host configuration protocol relay, the interface of the network-enabled device configured to receive a request from the streaming media device; and
   a hardware processor configured to
      identify the request as including a vendor identifier, a circuit identifier and a remote identifier associated with the streaming media device,
      allow the request from the streaming media device using a vendor matching policy comprising approved manufacture identification and approved vendor identification information, and
      transmit an acknowledgement comprising the circuit identifier and the remote identifier to the streaming media device.

2. The network-enabled device of claim 1, wherein the interface of the network-enabled device and the interface of the streaming media device are physically linked to establish a point-to-point connection.

3. The network-enabled device of claim 1, wherein the request comprises Option 82 information.

4. The network-enabled device of claim 3, wherein the Option 82 information comprises the circuit identifier and the remote identifier.

5. The network-enabled device of claim 1, further comprising a physical memory comprising the vendor matching policy.

6. The network-enabled device of claim 5, wherein the vendor matching policy comprises approved circuit identification and remote identification.

7. The network-enabled device of claim 1, wherein the processor is further configured to execute the vendor matching policy to determine whether to allow the request from the streaming media device.

8. The network-enabled device of claim 7, wherein the processor is further configured to inspect a media access control layer of the request from the streaming media device to determine whether to allow the request from the streaming media device.

9. A computer-implemented method, comprising:
receiving, at a network-enabled device, a request message from a streaming media device, wherein the network-enabled device and the streaming media device are connected by bypassing a dynamic host configuration protocol relay;
identifying, by the network-enabled device, the request as including a vendor identifier, a circuit identifier and a remote identifier associated with the streaming media device;
allowing, by the network-enabled device, the request using a vendor matching policy comprising approved manufacturer identification information and approved vendor identification information; and
transmitting an acknowledgement comprising the circuit identifier and the remote identifier to the streaming media device.

10. The computer-implemented method of claim 9, wherein the interface of the network-enabled device and the interface of the streaming media device are physically linked to establish a point-to-point connection.

11. The computer-implemented method of claim 9, wherein the request message comprises Option 82 information.

12. The computer-implemented method of claim 11, wherein the Option 82 information comprises the circuit identifier and the remote identifier.

13. The computer-implemented method of claim 9, wherein the vendor matching policy comprises approved circuit identification and remote identification.

14. The computer-implemented method of claim 13, further comprising: inspecting a media access control layer of the request message from the streaming media device to determine whether to allow the request message from the streaming media device.

15. A non-transitory computer-readable storage medium comprising instructions, that when read by a processor, cause the processor to:
receive at a network-enabled device a request message from a streaming media device, wherein the network-enabled device and the streaming media device are connected by bypassing a dynamic host configuration protocol relay;
identify, by the network-enabled device, the request as including a vendor identifier, a circuit identifier and a remote identifier associated with the streaming media device;
allow, by the network-enabled device, the request from the streaming media device using a vendor matching policy comprising approved manufacturer identification information and approved vendor identification information; and
transmit an acknowledgement comprising the circuit identifier and the remote identifier to the streaming media device.

16. The non-transitory computer-readable storage medium of claim 15, wherein an interface of the network-enabled device and an interface of the streaming media device are physically linked to establish a point-to-point connection.

17. The non-transitory computer-readable storage medium of claim 15, wherein the request message comprises Option 82 information.

18. The non-transitory computer-readable storage medium of claim 17, wherein the Option 82 information comprises the circuit identifier and the remote identifier.

19. The non-transitory computer-readable storage medium of claim 15, wherein the vendor matching policy comprises approved circuit identification and remote identification.

20. The non-transitory computer-readable storage medium of claim 15, wherein the computer program is further configured to cause the processor to inspect a media access control layer of the request message from the streaming media device to determine whether to allow the request message from the streaming media device.

* * * * *